(12) United States Patent
Shin

(10) Patent No.: US 8,948,678 B2
(45) Date of Patent: Feb. 3, 2015

(54) SCANNING APPARATUS AND IMAGE FORMING APPARATUS HAVING THE SAME

(75) Inventor: Dae-Lim Shin, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 806 days.

(21) Appl. No.: 12/538,393

(22) Filed: Aug. 10, 2009

(65) Prior Publication Data

US 2010/0040398 A1    Feb. 18, 2010

(30) Foreign Application Priority Data

Aug. 12, 2008 (KR) ........................ 10-2008-0079145

(51) Int. Cl.
  *G03G 15/00*   (2006.01)
  *E05D 7/04*   (2006.01)
  *H04N 1/00*   (2006.01)

(52) U.S. Cl.
  CPC ......... *H04N 1/00554* (2013.01); *G03G 15/605* (2013.01); *H04N 1/00543* (2013.01); *H04N 1/00557* (2013.01); *G03G 2221/16844* (2013.01)
  USPC ............. 399/380; 399/367; 399/362; 16/242; 16/245

(58) Field of Classification Search
  USPC ............ 399/380, 362; 16/248, 235, 309, 375, 16/242, 245, 247, 249, 364, 360, 362
  See application file for complete search history.

(56) References Cited

U.S. PATENT DOCUMENTS

| 6,684,456 | B2 * | 2/2004 | Lee ................................. 16/342 |
| 6,882,822 | B2 * | 4/2005 | Gomi et al. ................... 399/380 |
| 7,949,292 | B2 | 5/2011 | Choi |
| 2004/0218229 | A1 * | 11/2004 | Chol ............................. 358/474 |
| 2005/0135855 | A1 * | 6/2005 | Park et al. ..................... 399/405 |
| 2007/0251056 | A1 | 11/2007 | Aoyagi |
| 2008/0056748 | A1 | 3/2008 | Oh |

FOREIGN PATENT DOCUMENTS

| JP | 2007-300247 | 11/2007 |
| KR | 10-2004-0093931 | 11/2004 |
| KR | 10-0553908 | 2/2006 |
| KR | 10-2008-0021439 | 3/2008 |

OTHER PUBLICATIONS

Korean Office Action issued Sep. 28, 2012 in corresponding Korean Patent Application No. 10-2008-0079145.
Korean Office Action issued Mar. 20, 2013 in corresponding Korean Patent Application No. 10-2008-0079145.

* cited by examiner

*Primary Examiner* — Matthew G Marin
(74) *Attorney, Agent, or Firm* — Staas & Halsey LLP

(57) ABSTRACT

A scanning apparatus and an image forming apparatus having the same. The scanning apparatus includes: a main body having a scanning unit; a cover to open and close upon an upper surface of the main body; a hinge unit disposed on one of the main body and the cover so that the cover is rotatable with respect to the main body; a hinge accommodating unit disposed on the other of the main body and the cover to accommodate the hinge unit so that the cover is movable in an upward and downward direction with respect to the upper surface of the main body; and a movement restricting unit disposed on at least one of the hinge unit and the hinge accommodating unit to restrict a movement of the cover in the upward and downward direction.

20 Claims, 9 Drawing Sheets

SCANNING APPARATUS AND IMAGE FORMING APPARATUS HAVING THE SAME

CROSS-REFERENCE TO RELATED APPLICATION

This application claims benefit of Korean Application No. 10-2008-0079145, filed Aug. 12, 2008 in the Korean Intellectual Property Office, the disclosure of which is incorporated herein by reference.

BACKGROUND OF THE INVENTION

1. Field of the Invention

Aspects of the present invention relate to a scanning apparatus and an image forming apparatus having the same, and more particularly to a scanning apparatus capable of improving maintenance and user safety, and an image forming apparatus having the same.

2. Description of the Related Art

An image forming apparatus forms an image on a printing medium (the printing medium may be paper, a transparency, an adhesive label or sticker, etc.), and the image forming apparatus may be an electronic copier, a printer, a multifunction device, a facsimile, or other such devices. Also, the image forming apparatus, such as the electronic copier, includes a scanning apparatus for scanning an image appearing on a document to be scanned, and includes a scanning apparatus having an automatic document feeder (ADF) for automatically transporting the document to be scanned to a scanning unit of the scanning apparatus.

The automatic document feeder is disposed on an upper side of a main body of the scanning apparatus, and a transparent flat glass is disposed on an upper surface of the main body so that a user can manually dispose a document to be scanned thereon. Also, the automatic document feeder rotates so as to open and close upon the upper surface of the main body.

However, for maintenance of the automatic document feeder, the automatic document feeder should easily detach from the main body.

Also, in scanning a book or a thick document, it is preferable that the automatic document feeder is movable in an up and down direction to some extent so that the automatic document feeder can stably press the book or the thick document.

Also, if a user detaches the automatic document feeder from the main body by mistake, factors which bodily harm or physically injure the user should be prevented.

SUMMARY OF THE INVENTION

Accordingly, it is an aspect of the present invention to provide a scanning apparatus enabling a user to safely use the scanning apparatus, and an image forming apparatus having the same.

Another aspect of the present invention is to provide a scanning apparatus allowing easy maintenance of the scanning apparatus, and an image forming apparatus having the same.

Another aspect of the present invention is to provide a scanning apparatus capable of stably scanning a thick document, and an image forming apparatus having the same.

Aspects of the present invention provide a scanning apparatus, including: a main body having a scanning unit; a cover to open and close upon an upper surface of the main body; a hinge unit disposed on one of the main body and the cover so that the cover is rotatable with respect to the main body; a hinge accommodating unit disposed on the other of the main body and the cover to accommodate the hinge unit so that the cover is movable in an upward and downward direction with respect to the upper surface of the main body; and a movement restricting unit disposed on at least one of the hinge unit and the hinge accommodating unit to restrict a movement of the cover in the upward and downward direction.

The cover may include an automatic document feeder which transports a document to be scanned to the scanning unit.

The movement restricting unit may include: an engagement unit disposed on one of the hinge unit and the hinge accommodating unit, and an engagement projection disposed on a position of the other of the hinge unit and the hinge accommodating unit at a predetermined interval distance in the upward and downward direction with respect to the engagement unit contacting the engagement unit if the cover moves upwardly with respect to the upper surface of the main body.

The engagement unit and the engagement projection may be detachably coupled to the hinge unit and the hinge accommodating unit.

The engagement projection may include an accommodating unit coupling piece coupled to the hinge accommodating unit, and an internal protruding piece protruding towards an inner part of the hinge accommodating unit, and the engagement unit may include a hinge unit coupling piece coupled to a lower part of the hinge unit, and an external protruding piece protruding to an outer part of the hinge unit to contact the internal protruding piece in an inner part of the hinge accommodating unit.

The scanning apparatus may further include a coupler detachably coupling the accommodating unit coupling piece and the hinge accommodating unit.

The hinge accommodating unit may further include a plurality of thru-holes formed in the upward and downward direction to allow the internal protruding piece to pass through to adjust the predetermined interval distance between the engagement projection and the engagement unit.

The hinge accommodating unit may include a hinge unit accommodating space formed in an upward and downward direction to accommodate the hinge unit, and the hinge unit extends in the upward and downward direction to slide in the hinge unit accommodating space.

The scanning apparatus may further include an elastic member elastically biasing the cover so that the cover is rotatable in a direction of opening the upper surface of the main body.

Aspects of the present invention provides an image forming apparatus, including: the above scanning apparatus; and an image forming unit to form on a printing medium an image corresponding to image data of a document to be scanned by the scanning unit.

The movement restricting unit comprises an engagement unit disposed on one of the hinge unit and the hinge accommodating unit, and an engagement projection disposed on a position of the other of the hinge unit and the hinge accommodating unit at a predetermined distance interval in the upward and downward direction with respect to the engagement unit and contacting the engagement unit if the cover moves upwardly with respect to the upper surface of the main body.

The engagement unit and the engagement projection may be detachably coupled to the hinge unit and the hinge accommodating unit.

The engagement projection may include an accommodating unit coupling piece coupling the hinge accommodating unit, and an internal protruding piece protruding towards an inner part of the hinge accommodating unit, and the engagement unit may include a hinge unit coupling piece coupled to a lower part of the hinge unit, and an external protruding piece protruding to an outer part of the hinge unit to contact the internal protruding piece in an inner part of the hinge accommodating unit.

The image forming apparatus may further include a coupler detachably coupling the accommodating unit coupling piece and the hinge accommodating unit.

The hinge accommodating unit may further include a plurality of thru-holes formed in the upward and downward direction, and allowing the internal protruding piece to pass through to adjust the predetermined interval between the engagement projection and the engagement unit.

The hinge accommodating unit may include a hinge unit accommodating space formed in an upward and downward direction to accommodate the hinge unit, and the hinge unit extends in the upward and downward direction to slide in the hinge unit accommodating space.

The cover may rotate in a direction closing the upper surface of the main body by its own weight, and the image forming apparatus may further include an elastic member elastically biasing the cover so that the cover is rotatable in a direction of opening the upper surface of the main body.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, in which.

DETAILED DESCRIPTION OF THE EMBODIMENTS

Figure 1:
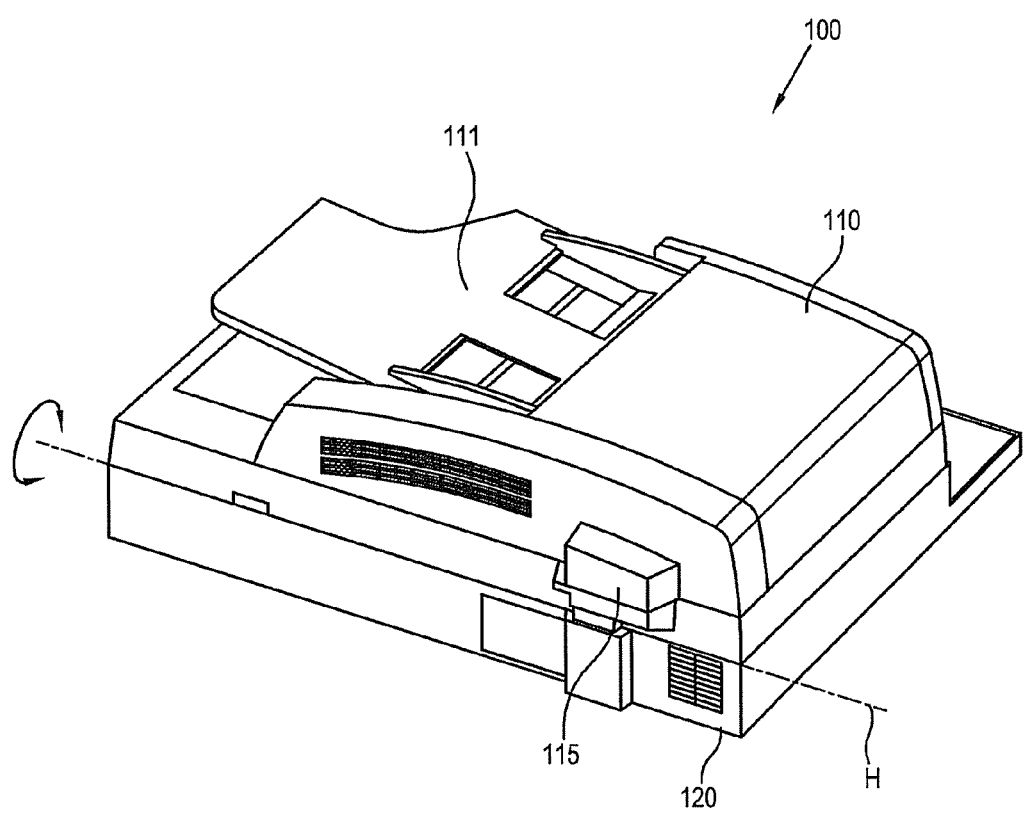
FIG. 1 is a schematic perspective view of a scanning apparatus according to a first embodiment of the present invention.

Reference will now be made in detail to the present embodiments of the present invention, examples of which are illustrated in the accompanying drawings, wherein like reference numerals refer to like elements throughout. The embodiments are described below in order to explain the present invention by referring to the figures.

According to a first embodiment of the present invention, as shown in FIG. 1, a scanning apparatus 100 includes a cover 110 and a main body 120.

Figure 6:
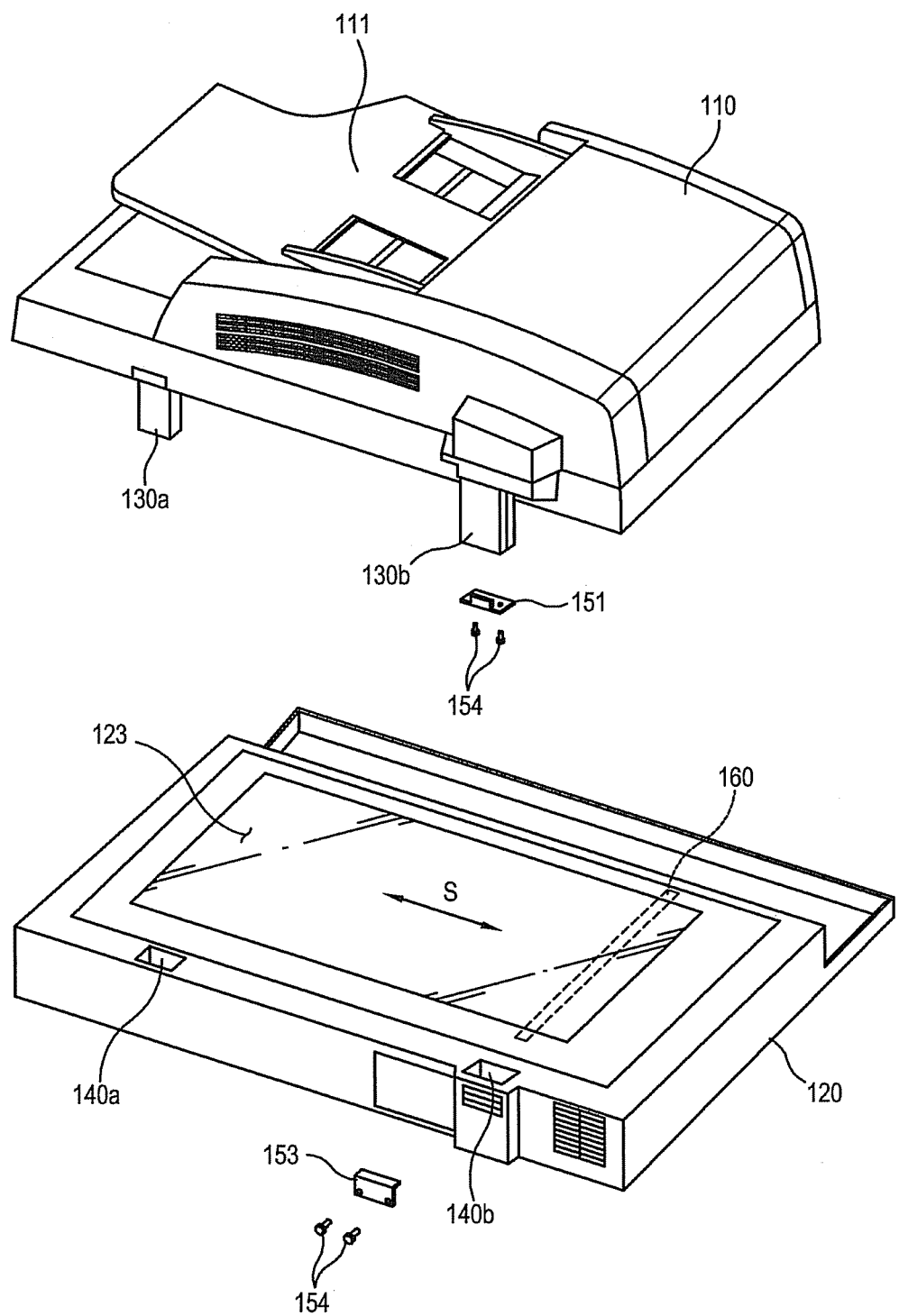
FIG. 6 is an exploded perspective view of the scanning apparatus in FIG. 5.

The main body 120 includes a scanning unit 160, as shown in FIG. 6, scanning a document to generate an image data corresponding to an image of the scanned document.

The cover 110 is disposed on an upper surface of the main body 120, and rotates about a hinge pivot line H to open and close upon the upper surface of the main body 120.

The cover 110 may include an automatic document feeder (ADF) 110a transporting a document to be scanned that is put on a document table 111 toward the scanning unit 160 in FIG. 6.

As shown in FIG. 6, the upper surface of the main body 120 includes a platen 123 formed of transparent glass. The document to be scanned may be put on the document table 111, and automatically transported to be scanned, or the document to be scanned may be put on the platen 123 manually to be scanned. The scanning unit 160 is disposed on a lower part of the platen 123, and the scanning unit 160 scans an image of the document to be scanned that is put on the platen 123 while moving along a scanning direction S. The automatic document feeder 110a transports the document to be scanned that is put on the document table 111 to the platen 123, the transported document is scanned, and the scanned document is discharged after completing the scanning. The transporting, scanning and discharging processes are repeated for the next sheet of the scanned document, thereby performing an automatic scanning for a plurality of sheets of documents.

Figure 2:
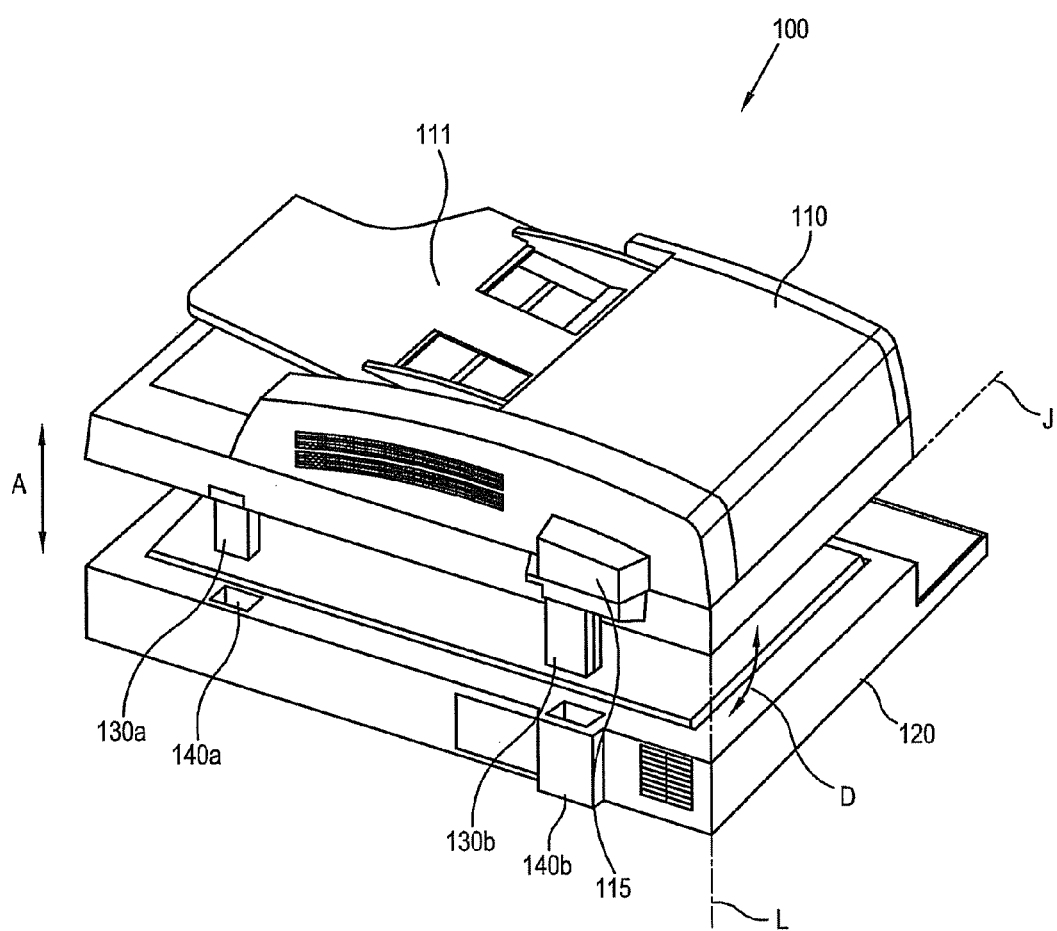
FIG. 2 is a schematic perspective view illustrating a cover of the scanning apparatus in FIG. 1 moved upwardly.

As shown in FIG. 2, an image forming apparatus 100 includes a plurality of hinge units 130a and 130b enabling the automatic document feeder 110a to rotate about the hinge pivot line H, as shown in FIG. 1, so that the automatic document feeder 110a can open and close upon the upper surface of the main body 120, and a plurality of hinge accommodating units 140a and 140b respectively accommodating the plurality of hinge units 130a and 130b. Two hinge units 130a and 130b and two hinge accommodating units 140a and 140b are illustrated in the present embodiment, however, aspects of the present invention are not limited thereto.

Figure 8:
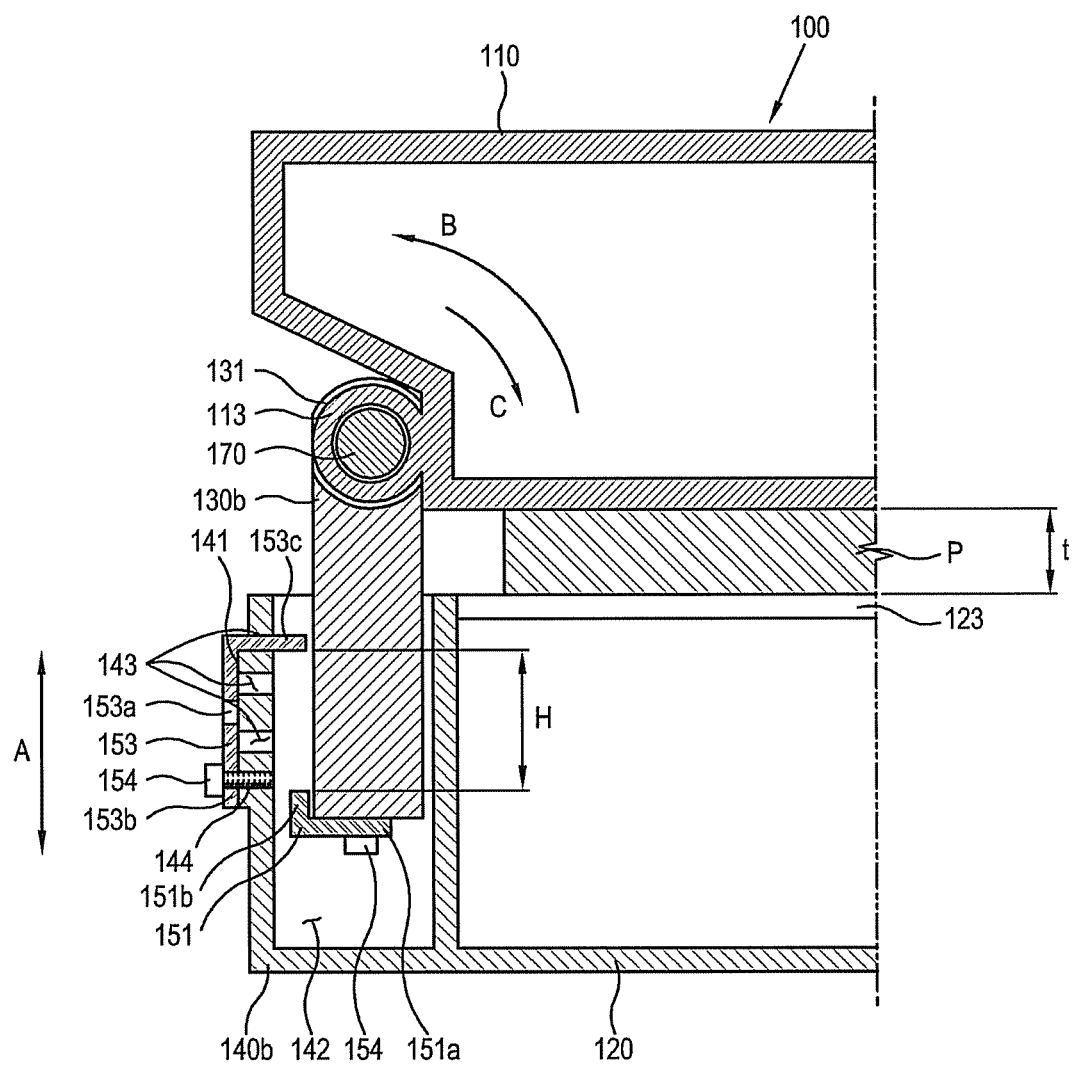
FIG. 8 is an enlarged sectional main portion view illustrating a document inserted to the scanning apparatus in FIG. 4.

The hinge units 130a and 130b are coupled to the automatic document feeder 110a to rotate about the hinge pivot 170 in FIG. 8.

Figure 5:
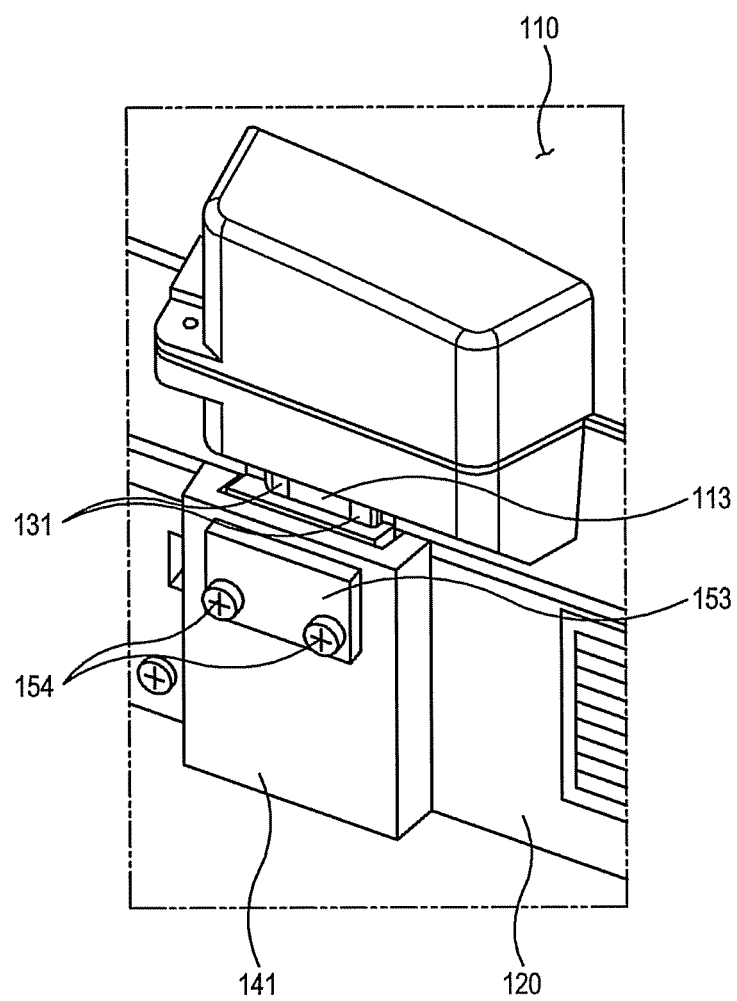
FIG. 5 is an enlarged perspective view illustrating a main portion of FIG. 4.

The automatic document feeder 110a and the hinge units 130a and 130b are respectively provided with hinge pivot insertion units 113 and 131, as shown in FIGS. 5 and 8, to which the hinge pivot 170 in FIG. 8 is inserted.

Also, for convenience of repair, as shown in FIG. 2, the hinge units 130a and 130b may be separated from the hinge accommodating units 140a and 140b if the cover 110 is lifted up from the main body 120 in an upward direction A.

Also, since the weight of the automatic document feeder 110a is considerable, the automatic document feeder 110a is not easily lifted when a user rotates and opens the automatic document feeder 110a.

Figure 3:
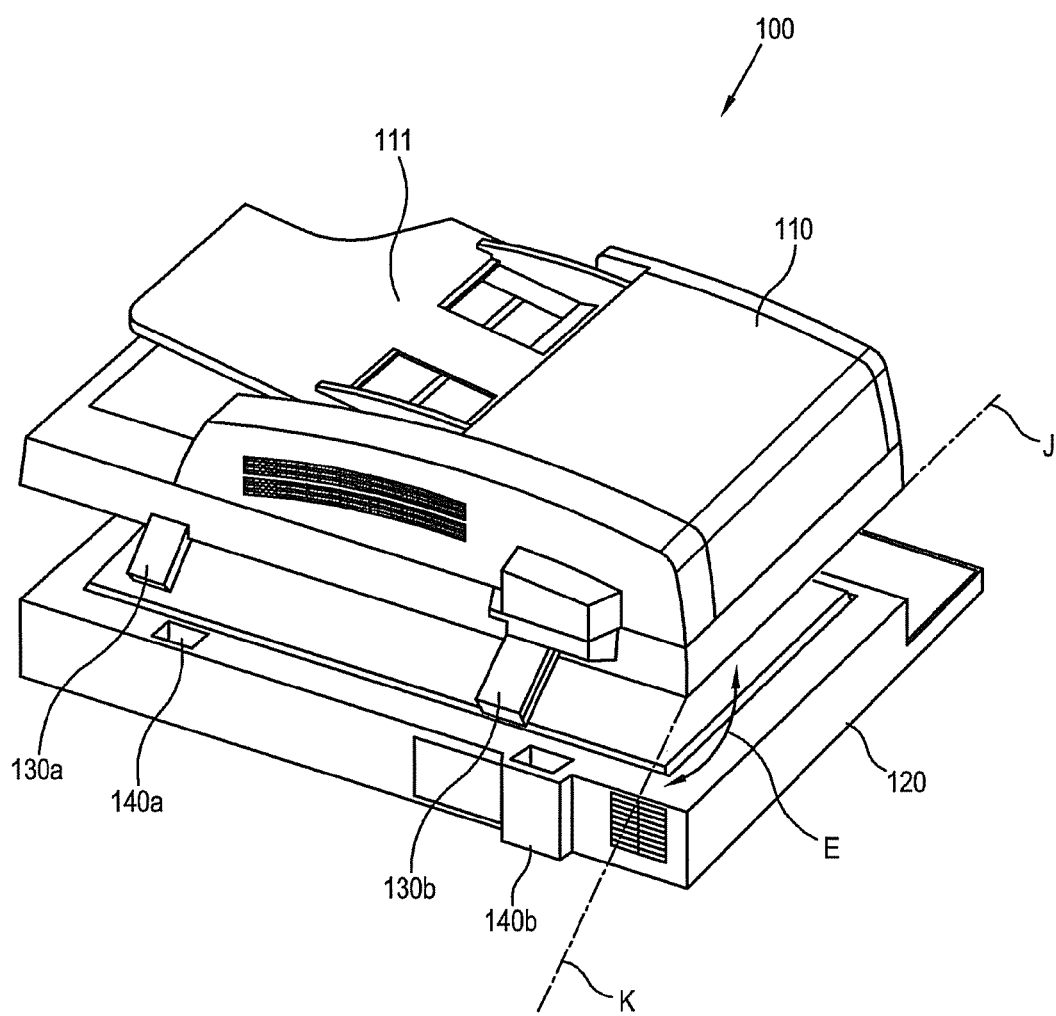
FIG. 3 is a schematic perspective view illustrating a hinge unit disposed to the cover in FIG. 2 elastically restored by an elastic member.
Figure 4:
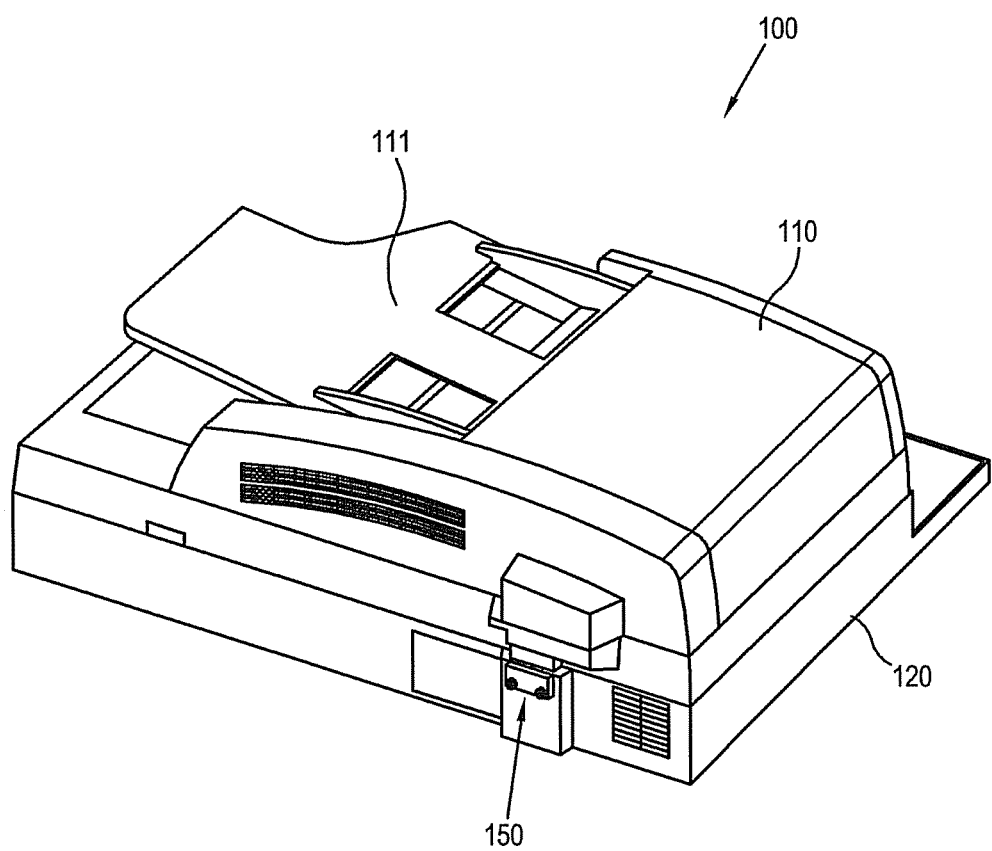
FIG. 4 is a schematic perspective view of the scanning apparatus in FIG. 1 provided with a movement restricting unit.

Accordingly, an elastic member (not shown) elastically biasing the automatic document feeder 110a so that the automatic document feeder 110a is rotatable in a direction of opening the upper surface of the main body 120 may be further provided so that a user can further easily rotate and open the automatic document feeder 110a. The elastic member is disposed on the hinge pivot 170 in FIG. 8, and as shown in FIG. 3, elastically biases the hinge units 130a and 130b so that an angle E between an extending line K of the hinge units 130a and 130b and a lower surface of the automatic document feeder 110a can have an obtuse angle in a balance state.

As shown in FIG. 2, if the hinge units 130a and 130b are accommodated on the hinge accommodating units 140a and 140b, because the hinge units 130a and 130b are prevented from rotating due to interference with the hinge accommodating units 140a and 140b, an angle D between an extending direction L of the hinge units 130a and 130b and the lower surface of the automatic document feeder 110a becomes smaller than that of the balance state described above. Accordingly, an elastic force of the elastic member is applied to the cover 110. In other words, the elastic force of the elastic member is applied in direction B, as shown in FIG. 8, to rotate and open the automatic document feeder 110a.

The automatic document feeder 110a rotates in direction C, as shown in FIG. 8, to close upon the upper surface of the main body 120 due to the weight of the automatic document feeder 110a.

Although the automatic document feeder 110a close upon the upper surface of the main body 120 due to its own weight, since the elastic force by the elastic member is added thereto as a user lifts up the automatic document feeder 110a, the user is capable of lifting up the automatic document feeder 110a by applying less force.

As shown in FIG. 2, the hinge units 130a and 130b may extend in an upward and downward direction A so that the automatic document feeder 110a can elevate in the upward and downward direction A. The hinge units 130a and 130b can elevate in the upward and downward direction A and can be inserted in the hinge accommodating units 140a and 140b so that the automatic document feeder 110a can elevate in the upward and downward direction A at a side to which the hinge units 130a and 130b are disposed, and concurrently, is rotatable about the hinge pivot line H.

Accordingly, if a thick document P, as shown in FIG. 8, is put on the platen 123, since the automatic document feeder 110a is capable of pressing the document P by being moved in the upward direction A by the thickness of the document P, a surface of the document P is flatly disposed on a surface of the platen 123. Accordingly, quality of a scanning data acquired according to scanning a thick document can be improved.

For example, when a part of a book is to be copied and the book is opened and put on the platen 123, the exposed pages of the book may closely contact the platen 123. However, a central part of the book to be copied may be substantially distanced from the platen 123, and accordingly, the focal distance from the scanning unit 160 to an image surface of the document to be scanned varies so that a scanning data corresponding to the central part of the book may be darker than that of a scanning data corresponding to the outer part of the book, and clarity of the scanning data corresponding to the outer part of the book deteriorates. Accordingly, since the automatic document feeder 110a moves in the upward direction A at the central part of the book disposed on the platen 123 to press the central part of the book, the book can closely contact the platen 123, thereby improving the quality of a scanned image.

The hinge accommodating units 140a and 140b may be provided in shapes corresponding to the hinge units 130a and 130b. As the hinge units 130a and 130b extend in the upward and downward direction A, the hinge accommodating units 140a and 140b may include a hinge unit accommodating space 142 in FIG. 8 extending in the upward and downward direction A to correspond thereto.

The automatic document feeder 110a further includes a roller (not shown) for transporting a document to be scanned that is put on the document table 111 to the scanning unit 160, and a driving motor (not shown) for rotating the roller. The driving motor may be disposed inside a driving motor accommodating unit 115.

The driving motor accommodating unit 115 may be provided to outwardly protrude from the automatic document feeder 110a in correspondence to the size of the driving motor.

Here, if a user mistakes the protruding driving motor accommodating unit 115 for a handle, and lifts the automatic document feeder 110a in the upward direction A, the hinge unit 130b is extended in a direction corresponding to the lifting as the hinge unit 130b is separated from the hinge accommodating unit 140b while an elastic member applies an elastic force. Accordingly, as the hinge unit 130 extends, a hand of the user holding the driving motor accommodating unit 115 may be caught between the hinge unit 130b and the main body or between other units of the image forming apparatus and may be injured.

To prevent this, the scanning apparatus 100 may further include a movement restricting unit 150 disposed on either the hinge unit 130b or the hinge accommodating unit 140b to restrict a movement in the upward and downward direction A of the cover 110 or the automatic document feeder 110a.

As shown in FIGS. 4 to 8, the movement restricting unit 150 includes an engagement unit 151 and an engagement projection 153.

Figure 7:
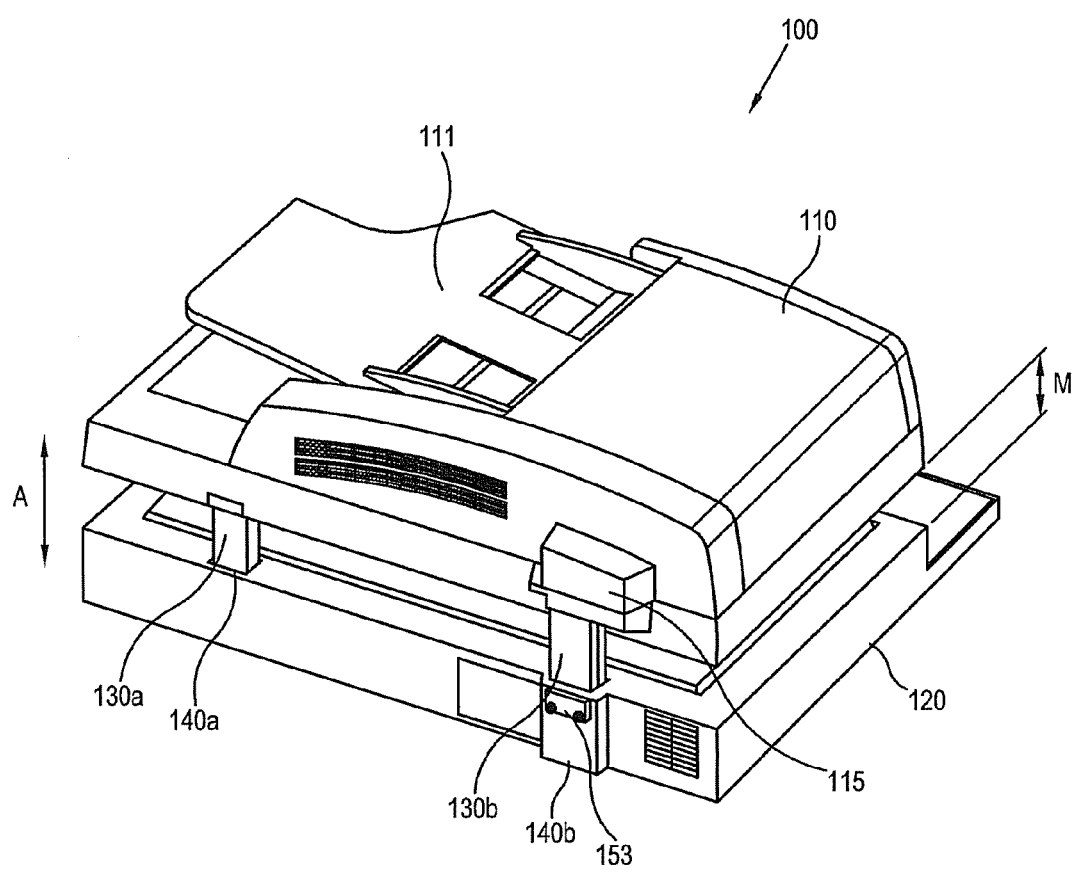
FIG. 7 is a schematic perspective view illustrating the cover of the scanning apparatus in FIG. 4 moved upwardly.

The engagement unit 151 is disposed on either the hinge units 130a and 130b or the hinge accommodating units 140a and 140b, and the engagement projection 153 is disposed on either the hinge units 103a and 130b or the hinge accommodating units 140a and 140b of which the engagement unit 151 is not disposed on, and is disposed to a position distanced from the engagement unit 151 by a predetermined interval H in the upward direction A. Accordingly, if the engagement unit 151 and the engagement projection 153 contact each other and interfere with each other, the hinge units 130a and 130b are prevented from being completely separated from the hinge accommodating units 140a and 140b, thereby restricting an upward movement thereof. Here, as shown in FIG. 8, since the predetermined interval H is an interval between the engagement unit 151 and the engagement projection 153 under the state that the document P is interposed between the automatic document feeder 110a and the platen 123, as shown in FIG. 7, a maximum distance interval M between the engagement unit 151 and the engagement projection 153 in the upward direction A becomes a value H+t which is the predetermined interval H added with the thickness t of the document P. That is, the cover 110 and the automatic document feeder 110a can move the maximum distance interval M in the upward direction A from the upper surface of the main body 120.

As shown in FIG. 7, although a user holds the driving motor accommodating unit 115 and lifts up the automatic document feeder 110a, the engagement unit 151 and the engagement projection 153 interfere with each other so that the hinge units 130a and 130b can be prevented from being separated from the hinge accommodating units 140a and 140b. Accordingly, an injury to the user can be prevented.

Also, the engagement projection 153 includes an accommodating unit coupling piece 153b coupled to an outer surface 141 of the hinge accommodating unit 140b, as shown in FIG. 8, and an internal protruding piece 153c protruding toward an inner part of the hinge accommodating unit 140b. Here, the accommodating unit coupling piece 153b and the hinge accommodating unit 140b are coupled by a coupler 154 such as a bolt which is capable of being detachably coupled.

Accordingly, if a user lifts up the driving motor accommodating unit 115 by mistake, the engagement unit 130b can be prevented from being separated from the hinge accommodating unit 140b by the interference between the engagement projection 153 and the engagement unit 151, thereby preventing an accident to the user.

Also, if it is necessary to detach the automatic document feeder 110a from the main body 120 for maintenance or repair, it is sufficient to disassemble the coupler 154 in order to detach the engagement projection 153 from the hinge accommodating unit 140b, thereby easily maintaining or repairing the scanning apparatus 100.

The hinge accommodating unit 140b includes a tap hole 144 formed with a female screw thread engaged with a male screw thread of the coupler 154.

The engagement unit 151 includes a hinge unit coupling piece 151a coupled to a lower part of the hinge unit 130b, and an external protruding piece 151b protruding to an outer part of the hinge unit 130b to contact with the internal protruding piece 153c in an inner part of the hinge accommodating unit 140b.

Also, as shown in FIG. 8, the hinge accommodating unit 140b includes a plurality of thru-holes 143 formed in the upward and downward direction A to adjust the predetermined internal distance H between the engagement unit 151 and the engagement projection 153.

The internal protruding piece 153c of the engagement projection 153 is disposed to pass through one of the plurality of thru holes 143 so that the predetermined interval H can be adjusted. For example, as shown in FIG. 8, the internal protruding piece 153c is illustrated to pass through a thru hole 143 of the most top position. Alternatively, the internal protruding piece 153c may be disposed to pass through a thru hole 143 of a central position as necessary. Here, if the engagement projection 153 is disposed to the thru hole 143 of the central position, a coupling hole 153a formed to the engagement projection 153 may be provided to accord to the tab hole 144. Accordingly, the engagement projection 153, the interval of which is adjusted can be coupled to the hinge accommodating unit 140b again with the same coupler 154.

As described above, the movement restricting unit 150 is illustrated, as seen in FIG. 5, to be disposed on only the hinge unit 130b and the hinge accommodating unit 140b of the right side among the hinge units 130a and 130b and the hinge accommodating units 140a and 140b of the opposite sides. Alternatively, the movement restricting unit 150 may be disposed on only the hinge unit 130a and the hinge accommodating unit 140a of the left side as necessary. Also, the movement restricting unit 150 may be disposed on all of the hinge units 130a and 130b and the hinge accommodating units 140a and 140b of the opposite sides as necessary.

Figure 9:
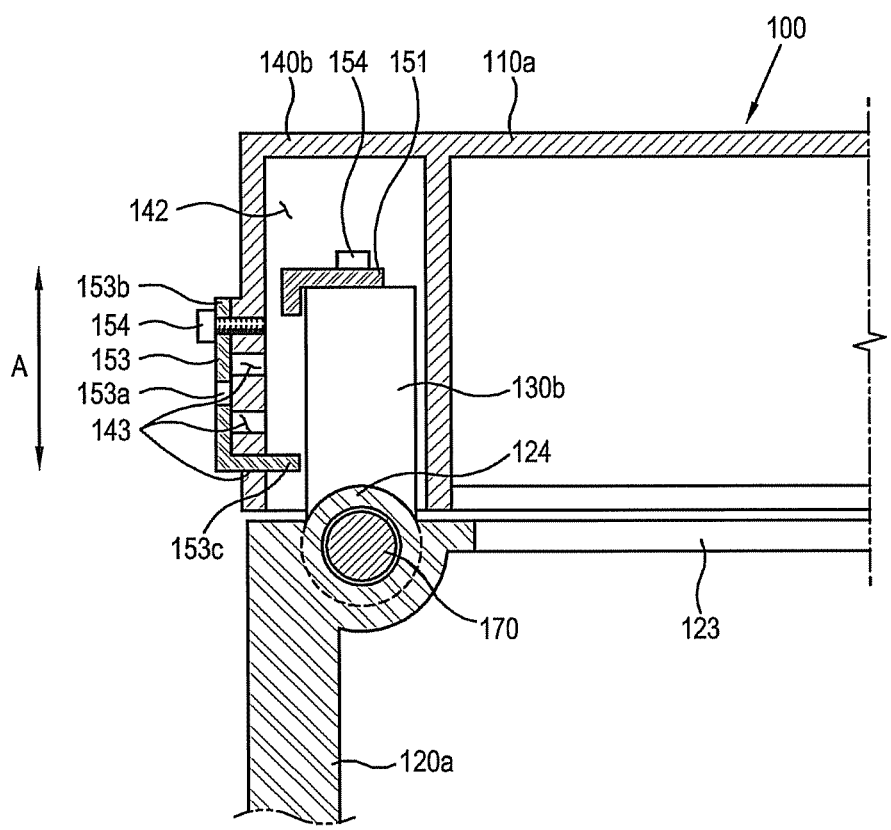
FIG. 9 is an enlarged sectional main portion view of a scanning apparatus according to a second embodiment of the present invention.

According to a secondary embodiment of the present invention, as shown in FIG. 9, a scanning apparatus 100 may include a hinge unit 130b disposed on a main body 120a, and a hinge accommodating unit 140b may be disposed on a cover 110a or on an automatic document feeder 110a.

The main body 120a includes a hinge pivot insertion unit 124 to which a hinge pivot 170 is inserted.

The positions to which the hinge unit 130b and the hinge accommodating unit 140b are disposed are opposite to those of the first embodiment, and detailed descriptions of the some elements will be omitted because they have the same configurations as the first embodiment.

An image forming apparatus (not shown) according to another embodiment of the present invention may further include the scanning apparatuses 100 or 100a described above, and an image forming unit (not shown) printing an image corresponding to an image of a document scanned by the scanning apparatuses 100 or 100a on a printing medium.

Here, the image forming apparatus may form an image by at least one of an inkjet type forming process forming an image on a printing medium with an ink, an electro-photographic type forming process forming an image on a printing medium with a toner, and a thermo-electronic type forming process forming an image on a heat sensitive printing medium by using a thermal printing head (TPH).

The inkjet type forming process has a printing head having a plurality of nozzles. The electro-photographic type forming process has an image carrying body (not shown) having an organic photo sensitive layer on an outer surface thereof, a light exposing unit (not shown) exposing a surface of the image carrying body to form an electrostatic latent image, a developing cartridge (not shown) developing the electrostatic latent image with a toner, a transferring unit (not shown) transferring the toner to a printing medium, and a fusing unit (not shown) fusing the toner transferred to the printing medium with heat and pressure.

As described above, a scanning apparatus and an image forming apparatus having the same according to aspects of the present invention have the following and or other effects.

First, safety of a user can be ensured in spite of mistake of the user.

Second, a scanning apparatus and an image forming apparatus can be easily repaired and maintained.

Third, scanning a thick document can be stably performed.

Although a few embodiments of the present invention have been shown and described, it will be appreciated by those skilled in the art that changes may be made in this embodiment without departing from the principles and spirit of the invention, the scope of which is defined in the claims and their equivalents.

What is claimed is:

1. A scanning apparatus, comprising: a main body having a scanning unit; a cover to open and close upon an upper surface of the main body;
   a hinge unit disposed on one of the main body and the cover so that the cover is rotatable with respect to the main body;
   a hinge accommodating unit disposed on the other of the main body and the cover to accommodate the hinge unit so that the cover is movable in an upward and downward direction with respect to the upper surface of the main body; and
   an movement restricting unit to restrict a movement of the cover in the upward and downward direction,
   wherein the movement restricting unit comprises:
   an engagement unit disposed on one of the hinge unit and the hinge accommodating unit, and
   an internal protruding piece of an engagement projection disposed on the other of the hinge unit and the hinge accommodating unit to contact the engagement unit when the cover moves upwardly with respect to the upper surface of the main body, the internal protruding piece which selectively passes through one of a plurality of thru-holes formed in the upward and downward direction in the other of hinge unit and the hinge accommodating unit, which adjusts with respect to the other of the hinge unit and the hinge accommodating unit, and which allows the cover to travel along a distance in the upward and downward direction that includes having the cover contact the upper surface of the main body,
   wherein if the internal protruding piece of the engagement projection passes through any one of the plurality of thru-holes, then a distance of travel for the cover is limited over a range of travel in the upward and downward direction which includes the cover contacting the upper surface of the main body.

2. The scanning apparatus according to claim 1, wherein the cover comprises an automatic document feeder which transports a document to be scanned to the scanning unit.

3. The scanning apparatus according to claim 1, wherein the engagement projection is disposed on a position of the other of the hinge unit and the hinge accommodating unit at a predetermined interval distance in the upward and downward direction with respect to the engagement unit, and contacts the engagement unit if the cover moves upwardly with respect to the upper surface of the main body.

4. The scanning apparatus according to claim 3, wherein the engagement unit and the engagement projection are detachably coupled to the hinge unit and the hinge accommodating unit.

5. The scanning apparatus according to claim 3,
wherein the engagement projection comprises an accommodating unit coupling piece coupled to the hinge accommodating unit, and the internal protruding piece which protrudes towards an inner part of the hinge accommodating unit, and
wherein the engagement unit comprises a hinge unit coupling piece coupled to a lower part of the hinge unit, and an external protruding piece protruding to an outer part of the hinge unit to contact the internal protruding piece in an inner part of the hinge accommodating unit.

6. The scanning apparatus according to claim 5, further comprising a coupler detachably coupling the accommodating unit coupling piece and the hinge accommodating unit.

7. The scanning apparatus according to claim 5, wherein the hinge accommodating unit further comprises the plurality of thru-holes formed in the upward and downward direction to allow the internal protruding piece to pass through to adjust the predetermined interval distance between the engagement projection and the engagement unit.

8. The scanning apparatus according to claim 1,
wherein the hinge accommodating unit comprises a hinge unit accommodating space formed in an upward and downward direction to accommodate the hinge unit, and
wherein the hinge unit extends in the upward and downward direction to slide in the hinge unit accommodating space.

9. The scanning apparatus according to claim 1, further comprising an elastic member elastically biasing the cover so that the cover is rotatable to expose the upper surface of the main body.

10. An image forming apparatus, comprising:
the scanning apparatus according to claim 1; and
an image forming unit to form on a printing medium an image corresponding to image data of a document scanned by the scanning unit.

11. The image forming apparatus according to claim 10, wherein the engagement projection is disposed on the other of the hinge unit and the hinge accommodating unit at a predetermined distance interval in the upward and downward direction with respect to the engagement unit.

12. The image forming apparatus according to claim 11, wherein the engagement unit and the engagement projection are detachably coupled to the hinge unit and the hinge accommodating unit.

13. The image forming apparatus according to claim 11,
wherein the engagement projection comprises an accommodating unit coupling piece coupling the hinge accommodating unit, and the internal protruding piece which protrudes towards an inner part of the hinge accommodating unit, and
wherein the engagement unit comprises a hinge unit coupling piece coupled to a lower part of the hinge unit, and an external protruding piece protruding to an outer part of the hinge unit to contact the internal protruding piece in an inner part of the hinge accommodating unit.

14. The image forming apparatus according to claim 13, further comprising a coupler detachably coupling the accommodating unit coupling piece and the hinge accommodating unit.

15. The image forming apparatus according to claim 13, wherein the hinge accommodating unit further comprises the plurality of thru-holes formed in the upward and downward direction, allowing the internal protruding piece to pass through to adjust the predetermined interval between the engagement projection and the engagement unit.

16. The image forming apparatus according to claim 10,
wherein the hinge accommodating unit comprises a hinge unit accommodating space formed in an upward and downward direction to accommodate the hinge unit, and
wherein the hinge unit extends in the upward and downward direction to slide in the hinge unit accommodating space.

17. The image forming apparatus according to claim 10,
wherein the cover rotates in a direction of closing the upper surface of the main body by a self weight, and
wherein the image forming apparatus further comprises an elastic member elastically biasing the cover so that the cover is rotatable in a direction of opening the upper surface of the main body.

18. The scanning apparatus according to claim 1,
wherein if the internal protruding piece of the engagement projection passes through one of the plurality of thru-holes, the distance of travel in the upward and downward direction is less than a maximum distance interval and the cover contacts the upper surface of the main body.

19. A method of coupling a cover of an image forming apparatus to a main body of the image forming apparatus, the method comprising:
coupling the cover of the image forming apparatus to the main body of the image forming apparatus with a hinge unit accommodated by a hinge accommodating unit to allow movement of the cover in directions perpendicular to a plane of a platen of the image forming apparatus;
applying a movement restricting force to at least one of the hinge unit and the hinge accommodating unit to restrict a movement of the cover in the directions perpendicular to the plane of the platen of the image forming apparatus; and
contacting an engagement unit disposed on one of the hinge unit and the hinge accommodating unit with an projection, which includes an internal protruding piece, disposed on the other of the hinge unit and the hinge accommodating unit to restrict the movement of the cover in the directions perpendicular to the plane of the platen of the image forming apparatus, the internal protruding piece which selectively passes through one of a plurality of thru-holes formed in the upward and downward direction in the other of the hinge unit and the hinge accommodating unit, which adjusts with respect to the other of the hinge unit and the hinge accommodating unit, and which allows the cover to travel along a distance in the upward and downward direction that include having the cover contact the upper surface of the main body, wherein if the internal protruding piece of the engagement projection passes through any one of the plurality of thru-holes, then a distance of travel for the cover is limited over a range of travel in the upward and downward direction which includes the cover contacting the upper surface of the main body.

20. The method according to claim 19, wherein the contacting the engagement unit comprises:
contacting the engagement unit with the internal protruding piece of the engagement projection at a predetermined distance interval in the upward and downward direction to restrict the movement of the cover in the directions perpendicular to the plane of the platen of the image forming apparatus.

\* \* \* \* \*

UNITED STATES PATENT AND TRADEMARK OFFICE
CERTIFICATE OF CORRECTION

PATENT NO. : 8,948,678 B2  
APPLICATION NO. : 12/538393  
DATED : February 3, 2015  
INVENTOR(S) : Dae-Lim Shin Page 1 of 1

It is certified that error appears in the above-identified patent and that said Letters Patent is hereby corrected as shown below:

In the Claims

Claim 1, Column 8, Line 54:

Delete "unit" and insert --unit if--, therefor (2$^{nd}$ Occurrence)

Claim 19, Column 10, Line 53:

Delete "an" and insert --an engagement--, therefor

Signed and Sealed this
Fifteenth Day of September, 2015

Michelle K. Lee
*Director of the United States Patent and Trademark Office*